No. 895,692. PATENTED AUG. 11, 1908.
A. SCRIVENOR.
BEARING FOR SCALE BEAMS.
APPLICATION FILED SEPT. 30, 1907.

Witnesses
Inventor
Arthur Scrivenor
By Stewart & Stewart
Attorneys

UNITED STATES PATENT OFFICE.

ARTHUR SCRIVENOR, OF RICHMOND, VIRGINIA.

BEARING FOR SCALE-BEAMS.

No. 895,692.　　　Specification of Letters Patent.　　Patented Aug. 11, 1908.

Application filed September 30, 1907. Serial No. 395,180.

*To all whom it may concern:*

Be it known that I, ARTHUR SCRIVENOR, a citizen of the United States of America, residing at the city of Richmond, in the county of Henrico and State of Virginia, have invented certain new and useful Improvements in Bearings for Scale-Beams, of which the following is a specification.

The present invention relates to bearings for scale beams.

The scales of the type in connection with which my bearing is shown have a horizontally disposed beam mounted intermediately of its longitudinal extent on a bearing about which it swings in a vertical plane. The bearing divides the beam into two arms of which one supports the commodity to be weighed, while the other carries a counterpoise, the moment of which about the beam bearing may be varied at the will of the operator. The commodity is placed on a receptacle which is supported by a knife edge rigidly attached to one arm of the beam. The knife edge is engaged by a bearing block, the means for mounting which in combination with other elements constitutes the subject matter of the present invention. The device hereinafter set forth holds the block securely in place and permits it to be easily removed for any purpose, such as replacing the block with a new piece of bearing material.

Figure 1:
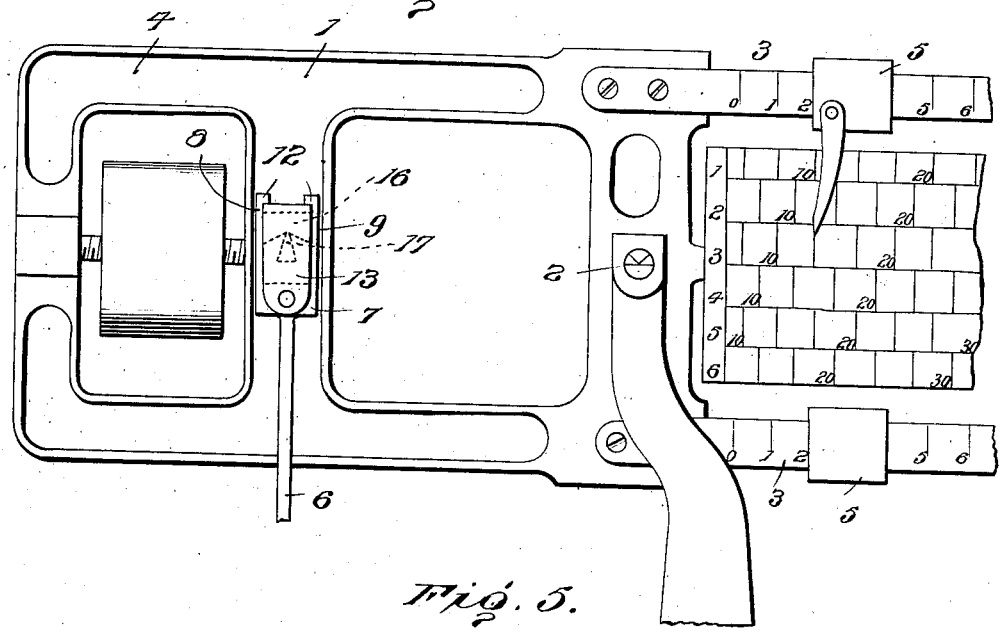
Figure 5:
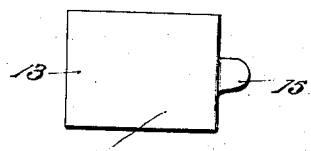
Figure 2:
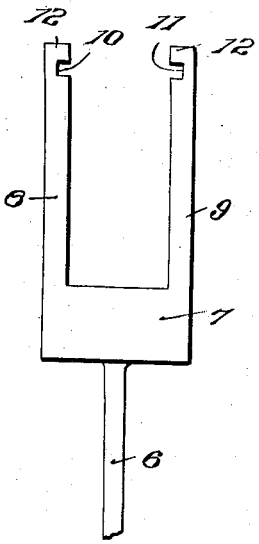
Figures 3, 4:
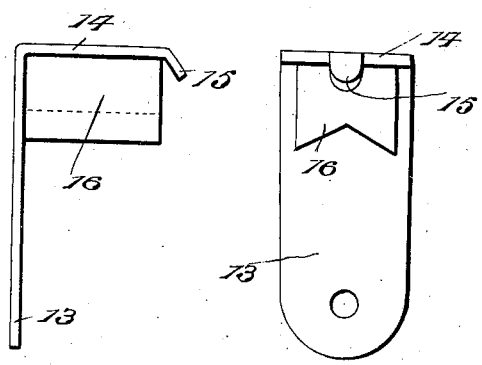

Referring to the accompanying drawings,—Figure 1 is an elevation of a portion of the scale beam showing a knife edge bearing and bearing block in operative position. Fig. 2 is an elevation of the box in which the block is supported. Figs. 3, 4 and 5 are views of the rest in side, front and top elevation.

The scale beam 1 is supported on an intermediate bearing 2, by which it is divided into arms 3 and 4. The arms 3 are provided with suitable counterpoise weights 5, the moment of which about the bearing 2 may be varied either by sliding the weights along the arm or by increasing or decreasing their mass. The commodity to be weighed is placed upon a suitable platform or scale pan not shown, which is connected by suitable means to the tension rod 6 (see Figs. 1 and 2). This rod is provided at its upper extremity with a box (7) open at the top and having vertical parallel sides (8 and 9), oppositely disposed. This box will be hereinafter referred to as U-shaped. The inner faces of these sides are grooved horizontally near their upper extremities at 10 and 11, forming shoulders (12). A rest (13) is formed of a piece of sheet metal of inverted L-shaped cross section, the horizontal arm (14) of the L having a tongue (15), which is bent downwardly at an angle of about 45°. The horizontal and vertical arms of the L are of constant lateral extent and the horizontal arm is adapted to enter the grooves 10 and 11, so that the rest closes the top and one side of the box 7. A suitable bearing block (16) of agate or similarly resistive material, provided with an angular groove in its lower face to receive the knife edge (17) occupies a position in the top of the box engaging the rest.

In assembling the device, the block is placed in the angle of the rest, its bearing face and the long arm of the L-shaped rest downwardly disposed. The box is held with its sides encompassing the knife edge, and the horizontal arm of the rest is pushed into the groove. The block is thus brought into place with its groove engaging the knife edge.

The tension member (6) connects the block to any suitable receptacle for the commodity. The bearing is commonly duplicated, one member being on each side of the beam, and the tension member (6) is U-shaped; the arms of the U each carrying a box. I have shown and described my bearing as supporting the commodity to be weighed. However, the bearing may be used in any part of the scale within the scope of my invention.

What I claim is:

1. A scale bearing, including a knife edge, and a block, and means for holding the block in rocking engagement with the knife edge, comprising a box open at the top having sides with abutments at their upper extremities, and a rest engaging the abutments and adapted to transmit downward pressure to the block.

2. A scale bearing, including a knife edge, and a block, and means for holding the block in rocking engagement with the knife edge, comprising a U-shaped box the sides of which are shouldered at their upper extremities, and an L-shaped rest engaging the shoulders and adapted to receive the block.

3. In a scale, a bearing comprising a knife edge secured to the beam and a block and means for holding the block in rocking engagement with the knife edge, comprising a box open at the top having opposing shouldered sides and a rest engaging the shoulders and means connected to the box for receiving the commodity to be weighed.

4. A scale beam bearing, consisting of a U-shaped box having grooved sides, an L-shaped rest adapted to slide in the groove, and a bearing block inclosed laterally by the rest and the sides of the box, and a knife edge engaging the block and pressing it against the horizontal arm of the L.

Signed by me at Richmond, Va., this 21st day of September, 1907.

ARTHUR SCRIVENOR.

Witnesses:
FRED S. KITCHEN,
J. STUART REYNOLDS.